Aug. 17, 1926.
K. TESSKY
1,596,258
TOOL SLIDE
Filed June 30, 1925
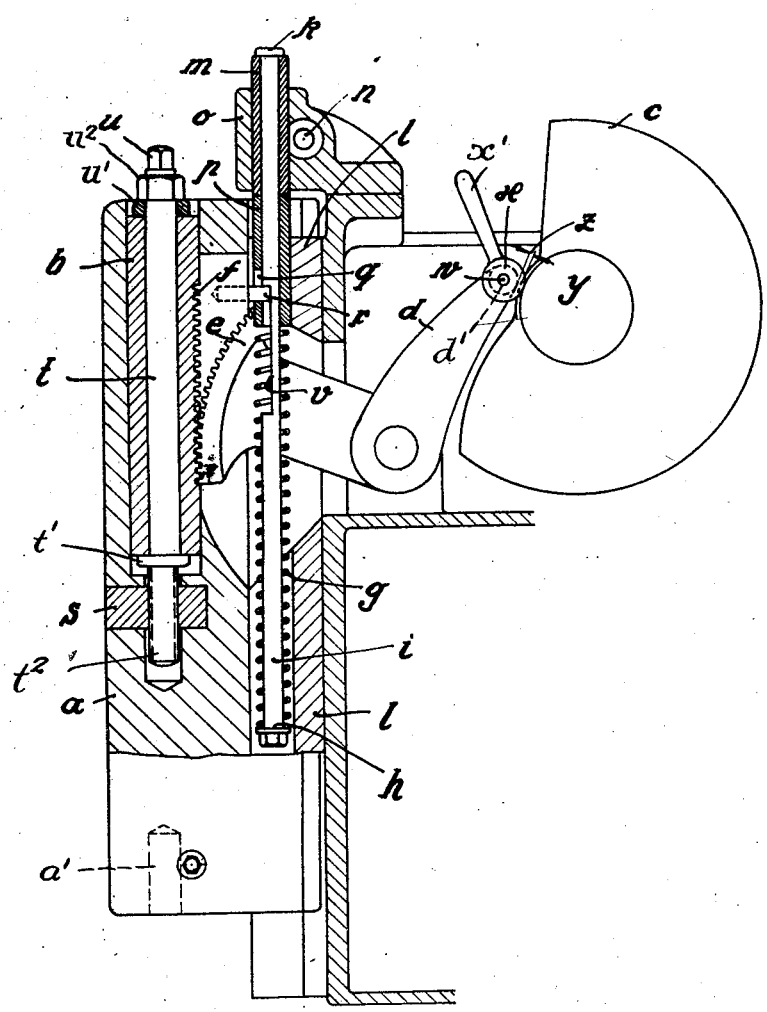
Inventor:
Karl Tessky
by Klauchann
Atty Patented Aug. 17, 1926.

1,596,258

UNITED STATES PATENT OFFICE.

KARL TESSKY, OF ESSLINGEN-ON-THE-NECKAR, GERMANY.

TOOL SLIDE.

Application filed June 30, 1925, Serial No. 40,647, and in Germany July 21, 1924.

My invention relates to machine tools and more especially to the tool slides which are automatically reciprocated relative to the workpiece and adapted to be adjusted in the direction in which they are reciprocated and which are provided with a pull-back spring which is placed under tension during the forward stroke of the tool slide.

As a rule such tool slides are controlled by a cam-actuated mechanism and means must be provided for preventing the roller lever cooperating with the cam from striking the cam a hard blow towards the end of the return stroke of the tool slide.

It has been proposed to overcome this drawback by utilizing the pull-back spring of the tool slide for absorbing the shock. This arrangement, however, involves the difficulty that the shock absorber must be adjusted every time the tool slide is adjusted and in the existing machines this can only be effected by testing.

It is an object of my invention to provide a device of the kind described in which the shock absorber is adjusted without trouble and loss of time, and with great exactitude in conformity with the adjustment of the tool slide. To this end I provide the frame of the machine with an adjustable check which is so arranged that, when released, it may be displaced in accordance with the adjustment of the tool slide.

In the drawings affixed to the specification and forming part thereof a device embodying my invention is illustrated diagrammatically in axial section by way of example:

Referring to the drawings, $a$ is the tool side and $a'$ is a bore adapted to hold a tool. $c$ is a cam to which rotation is imparted by suitable means, and $d'$ is a roller at the end of a lever $d$. A toothed segment $e$ is secured on the shaft of lever $d$ and meshes with a rack $f$ located in the tool slide $a$.

$i$ is a pin projecting into a recess of the tool slide $a$. A shoulder $k$ formed on the outer end of this pin abuts against a check $m$ which is formed as a sleeve surrounding the pin $i$. Sleeve $m$ is secured in a bracket $o$ and held therein by a clamp screw $n$. Another sleeve $p$ is placed on the pin $i$ adjacent the sleeve $m$ and a pull-back spring $g$ is inserted between the inner end of said sleeve and a washer $h$ at the end of pin $i$.

Pin $i$ is slotted at $v$ and sleeve $p$ is slotted at $q$. A dog $r$ secured to the tool slide $a$ projects into both slots.

The rack $f$ is formed on a sleeve $b$ mounted on a spindle $t$ between a shoulder $t'$ and a washer $u'$. The washer $u'$ is held in position by a nut $u^2$. The inner end of the spindle is threaded at $t^2$ and a nut $s$ for the thread is inserted in the tool slide $a$. It will be understood that by rotating the spindle $t$ by means of a wrench applied to its square end $u$, rack $f$ will be displaced relative to the tool holder.

In the position shown in the drawing the tool slide $a$ has completed its return stroke with the exception of the distance corresponding to the distance $z$ separating the roller $d'$ from the face of the cam. Sleeve $p$ engages check $m$ and dog $r$ engages the outer end of slot $b$, but is permitted to move further to the right with the pin $i$ by the slot $q$ and sleeve $p$. In doing so its displaces pin $i$ against the tension of spring $g$ until roller $d'$ has moved through the distance $z$, so that the spring $g$ absorbs the shock.

When the tool slide has been adjusted by displacing the rack $f$ as described, the necessary adjustment of the shock absorber is effected by unscrewing the screw $n$ and allowing the sleeve $m$ to follow the displacement of the tool slide until the roller $d'$ is at the predetermined distance $z$ from the face of the cam $c$. The distance is adjusted by means of a gauge $x$ provided with a handle $x'$ and temporarily secured on the end of lever $d$. When disc $x$ engages the shaft $y$ of the cam, the roller $d'$ is at the correct distance $z$ from the face of the cam. The sleeve $m$ is now fixed in position by the screw $n$ and all parts of the shock absorber are in the correct position.

I wish it to be understood that I do not desire to be limited to the exact details of construction shown and described for obvious modifications will occur to a person skilled in the art.

I claim:

1. Tool slide for machine tools comprising cam-actuated mechanism for moving the tool slide into operative position, a pullback spring for returning the tool slide to its inoperative position, said pull-back spring being adapted to absorb the shock at the end of the return stroke of the tool slide, a pin adapted to cooperate with said pull-back spring, and an adjustable stationary check which is so engaged by said pin that the pin tends to move said check in the same direction as the tool slide.

2. Tool slide for machine tools comprising cam-actuated mechanism for moving the tool slide into operative position, a pull-back spring for returning the tool slide to its inoperative position, said pull-back spring being adapted to absorb the shock at the end of the return stroke of the tool slide, a pin adapted to cooperate with said pull-back spring, an adjustable stationary check which is so engaged by said pin that the pin tends to move said check in the same direction as the totol slide, a dog on said tool slide, a sleeve adapted to be displaced on said pin by said dog to cooperate with said adjustable check, and to be engaged by said pull-back spring so that said pull-back spring exerts axial pressure on said sleeve, said dog being adapted to engage longitudinal slots in said pin and said sleeve.

3. Tool slide for machine tools comprising cam-actuated mechanism for moving the tool slide into operative position, a pull-back spring for returning the tool slide to its inoperative position, said pull-back spring being adapted to absorb the shock at the end of the return stroke of the tool slide, a pin adapted to cooperate with said pull-back spring, an adjustable stationary check which is so engaged by said pin that the pin tends to move said check in the same direction as the tool slide, said check being constructed as a sleeve surrounding said pin.

4. Tool slide for machine tools comprising a rack in said tool slide, means for adjusting the rack with regard to the tool slide, a toothed segment fulcrumed in the frame of the machine and adapted to mesh with said rack, a cam adapted to actuate said segment for moving the tool slide forward, a pull-back spring for returning the tool slide to its inoperative position, said pull-back spring being adapted to absorb the shock at the end of the return stroke of the tool slide, a pin adapted to cooperate with said pull-back spring, and an adjustable stationary check which is so engaged by said pin that the pin tends to move said check in the same direction as the tool slide.

5. Tool slide for machine tools comprising a rack in the tool slide, means for adjusting said rack with regard to the tool slide, a toothed segment fulcrumed in the frame of the machine and adapted to mesh with said rack, a lever secured to said segment and adapted to cooperate with said cam, a gauge adapted to determine the distance of the end of said lever from said cam, a pull-back spring for returning the tool slide to its inoperative position, said pull-back spring being adapted to absorb the shock at the end of the return stroke of the tool slide, a pin adapted to cooperate with said pull-back spring, and an adjustable stationary check which is so engaged by said pin that the pin tends to move said check in the same direction as the tool slide.

In testimony whereof I affix my signature.

KARL TESSKY.